(12) United States Patent
Dutouquet et al.

(10) Patent No.: US 10,150,234 B2
(45) Date of Patent: Dec. 11, 2018

(54) METHOD FOR MANUFACTURING AN INTERIOR LINING PART AND CORRESPONDING PART

(71) Applicants: Denis Dutouquet, Sainghin en Weppes (FR); Jacques Fevrier, Annoeullin (FR); Olivier Hochart, Noyelles les Vermelles (FR)

(72) Inventors: Denis Dutouquet, Sainghin en Weppes (FR); Jacques Fevrier, Annoeullin (FR); Olivier Hochart, Noyelles les Vermelles (FR)

(73) Assignee: REYDEL AUTOMOTIVE B.V., KN Baarn (NL)

( * ) Notice: Subject to any disclaimer, the term of this patent is extended or adjusted under 35 U.S.C. 154(b) by 545 days.

(21) Appl. No.: 14/446,014

(22) Filed: Jul. 29, 2014

(65) Prior Publication Data
US 2015/0028509 A1    Jan. 29, 2015

(30) Foreign Application Priority Data
Jul. 29, 2013 (FR) ...................... 13 57483

(51) Int. Cl.
*B32B 37/24* (2006.01)
*B29C 44/12* (2006.01)
(Continued)

(52) U.S. Cl.
CPC ........ *B29C 44/1214* (2013.01); *B29C 44/129* (2013.01); *B29C 44/1252* (2013.01);
(Continued)

(58) Field of Classification Search
CPC ......... B29C 44/1214; B32B 3/14; B32B 3/16; B32B 38/10
See application file for complete search history.

(56) References Cited

U.S. PATENT DOCUMENTS

| 6,457,739 B1* | 10/2002 | Dailey ................ B60R 21/2165 |
| | | 280/728.3 |
| 2004/0151875 A1* | 8/2004 | Lehr ...................... A63C 5/003 |
| | | 428/131 |

(Continued)

FOREIGN PATENT DOCUMENTS

| FR | 2894868 A1 | 6/2007 |
| FR | 2937275 A1 | 4/2010 |

(Continued)

*Primary Examiner* — Galen H Hauth
(74) *Attorney, Agent, or Firm* — Dickinson Wright PLLC

(57) ABSTRACT

A method for manufacturing an interior lining part, includes producing a skin; placing the skin in a foaming mold with a support layer; foaming an intermediate layer; cutting out an area of the skin producing a cutout area of the skin; placing a piece of adhesive tape or film in the cutout area, the piece of adhesive tape or film being placed in between the skin and the intermediate foam layer; and placing an insert in the cut out area of the skin. A method for manufacturing an interior lining part, includes producing a skin by rotational molding; placing a piece of adhesive tape or film in the cutout area, the piece of adhesive tape or film being placed in between the skin and the intermediate foam layer; placing the skin in a foaming mold with a support layer; foaming an intermediate layer; cutting out an area of the skin producing a cutout area of the skin; and placing an insert in the cut out area of the skin.

17 Claims, 2 Drawing Sheets

(51) Int. Cl.
*B29C 69/00* (2006.01)
*B32B 38/10* (2006.01)
B29C 41/08 (2006.01)
B29C 41/18 (2006.01)
B32B 38/00 (2006.01)

(52) U.S. Cl.
CPC ............ *B29C 69/001* (2013.01); *B32B 38/10* (2013.01); *B29C 41/08* (2013.01); *B29C 41/18* (2013.01); *B32B 2038/0084* (2013.01); *B32B 2605/003* (2013.01)

(56) References Cited

U.S. PATENT DOCUMENTS

| | | |
|---|---|---|
| 2005/0019439 A1 | 1/2005 | Matsuki et al. |
| 2011/0077346 A1* | 3/2011 | Humphrey ......... C08G 18/3206 524/505 |

FOREIGN PATENT DOCUMENTS

| | | | |
|---|---|---|---|
| FR | 2937276 A1 | 4/2010 | |
| JP | 2005205801 A | 8/2005 | |
| WO | 2010/046600 A1 | 4/2010 | |
| WO | 2013026571 A1 | 2/2013 | |
| WO | WO 2014001462 A1 * | 1/2014 | ......... B32B 37/1284 |

* cited by examiner

METHOD FOR MANUFACTURING AN INTERIOR LINING PART AND CORRESPONDING PART

CROSS-REFERENCE TO RELATED APPLICATIONS

This U.S. Patent Application claims priority to French Patent Application No. 1357483, filed Jul. 29, 2013 entitled "Method for Manufacturing an Interior Lining Part and Corresponding Part," the entire disclosure of the application being considered part of the disclosure of this application and hereby incorporated by reference.

BACKGROUND

The trim or lining parts referenced in this disclosure include a surface skin that is flexible to the touch, an intermediate layer made of a foamed or cellular substance, and a rigid support layer.

In various implementations of trim or lining parts, one may integrate one or more additional surface element(s) partially or completely embedded in the thickness of the surface skin (flush or projecting element). The addition of such may be provided for decorative and/or functional reasons.

Vehicle users and manufacturers demand certain preferences, which may frustrate production. The demands may be related to aesthetic, technical and economic constraints and/or demands. For example, the demands may be related to:

- providing an embedding as well as an optimal finish between the flexible skin and the additional elements added to the surface in the skin with zero gap between the skin and each element (absence of a visible groove, mounting with zero tolerance) and with an effect of continuity on the visible surface of the part (if applicable, perfectly flush between the surface of the skin and the surface of the additional element);
- providing an option of variations in terms of appearance, shape and material for the additional elements, without impacting the production tools, particularly the skin shaping mold (which is a shell for producing the skin by the so-called "slush" method or by spraying of PU) and the foaming mold;
- being able to attach additional elements even when the configuration, the topology and/or the local geometry of the part is/are unfavorable for such attachment in an obvious manner;
- being able to reduce or limit the complexity of the manufacturing method;
- being able to reduce the costs of the tools and/or the cost prices of the parts;
- being able to put in place a plurality (two, three, four or more) of additional elements at separate or even mutually distant sites, even when these elements are of small size;
- being able to produce parts with and without additional element in the same foaming mold (or with minimal modification of the latter) and/or without additional element in the mold for shaping the skin with just-in-time production management.

Various techniques are already known that make it possible to mount additional elements, in the form of surface inserts, on parts of the above-mentioned type.

For example, in document WO 2013/026571, a method for producing an interior lining part formed by a support body covered with a decorative layer is disclosed.

The support body has an indented area produced by molding or obtained by deformation to receive by insertion an additional element having a complementary shape. The integral securing of this insert is carried out or reinforced by an anchoring points that engages in the material of the support body.

However, this involves a different mold shape for each different shape of additional element or each different installation site for these elements. In addition, the additional elements comprise beveled side walls and the support body becomes fragile due to the installation of anchoring points.

In another example, in document FR 2 937 276, a method for manufacturing a dashboard comprising a decorative element is disclosed. In the context of this method, a skin is first formed in a shaping mold with creation of an indentation or of a recess, by placement of a functional insert. This formed skin is then transferred to a foaming mold in which the intermediate foam layer is produced and the functional insert is then replaced by a decorative insert having the same shape.

Nevertheless, the replacement of the inserts is possible only for particular shapes and it does not make it possible to guarantee zero peripheral interstices between the final insert and the skin, or a reliable maintaining of said final decorative insert over time.

In another example, in document WO 2010/046600, a method is known for manufacturing dashboards of the type mentioned in the introduction, in which the additional element in the form of a decorative part is mounted in a cut out portion of the skin.

Specifically, the additional element includes a peripheral shoulder which abuts against the internal or back wall of the skin, along the contour of the cut-out produced beforehand in the latter. The skin provided with this element is then arranged in the foaming mold to produce the intermediate layer.

This solution requires the presence of a shoulder over the entire periphery of the additional element, which constitutes a major manufacturing constraint and limits the possible shapes for the additional element. In addition, it is no longer possible to guarantee the sealing of the cut-out, since it depends both on the positioning of the additional element in the cut and on the manner in which the foaming develops during the manufacturing of the intermediate layer.

Also disclosed is a technique for mounting on the surface functional and/or decorative inserts by encapsulation of the latter by the skin (a technique called "inskin" and described in particular in the document FR 2 894 868).

This technique consists of heating the skin before arranging it in the foaming mold, the insert having been arranged beforehand between the skin and the wall of the mold. Then, the skin is applied by suction against the wall in such a manner that the insert becomes embedded in the skin. The manufacturing of the part is then completed by foaming the intermediate layer.

This technical solution may not be employed for certain skin molding technologies when the base material is a powder (for example, the so-called "slush molding" method) or an excessively fluid chemical substance (for example, spraying of PU), or when the mold has to be brought to a high temperature (for example, "slush molding": 300° C.), or when the skin shaping mold has to perform prohibitory movements (for example, rotation in rotational molding for "slush molding").

SUMMARY

Exemplary embodiments of the present disclosure provide a method for manufacturing an interior lining part and a corresponding part.

Additional features of the invention will be set forth in the description which follows, and in part will be apparent from the description, or may be learned by practice of the invention.

Disclosed herein is a method for manufacturing an interior lining part, includes producing a skin; placing the skin in a foaming mold with a support layer; foaming an intermediate layer; cutting out an area of the skin producing a cutout area of the skin; placing a piece of adhesive tape or film in the cutout area, the piece of adhesive tape or film being placed in between the skin and the intermediate foam layer; and placing an insert in the cut out area of the skin.

Also disclosed herein is a method for manufacturing an interior lining part, includes producing a skin by rotational molding; placing a piece of adhesive tape or film in the cutout area, the piece of adhesive tape or film being placed in between the skin and the intermediate foam layer; placing the skin in a foaming mold with a support layer; foaming an intermediate layer; cutting out an area of the skin producing a cutout area of the skin; and placing an insert in the cut out area of the skin.

DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

Figure 1:
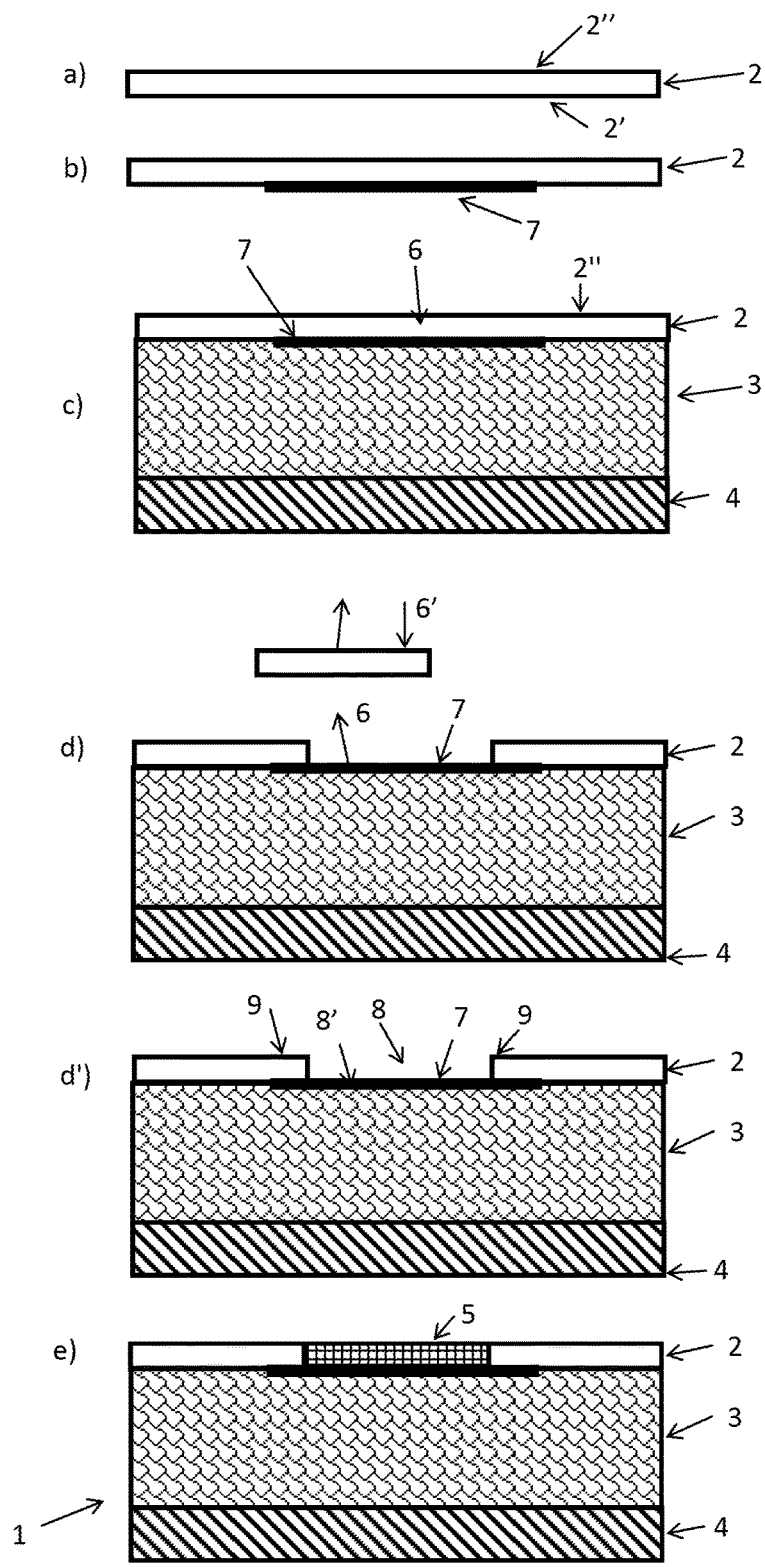
FIG. 1 illustrates diagrammatically the consecutive operating steps a) to e) of the method for manufacturing an interior trim or lining part.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The aspects disclosed herein overcome at least some and preferably all the disadvantages discussed in the Background, by proposing a simple and flexible technique for obtaining parts of the above-mentioned type that are provided with at least one decorative and/or functional surface insert. An insert may be any sort of decorative decal or object placed into a molding of an interior panel, for example, an automobile panel. The aspects disclosed herein satisfy some if not all of the demands enumerated above in the Background section.

FIG. 1 illustrates diagrammatically the consecutive operating steps a) to e) of the method for manufacturing an interior trim or lining part.

This type of part 1 includes a surface skin 2 (flexible and soft to the touch), an intermediate layer 3 made of a foamed or cellular substance, and a support layer 4 (which may be rigid). As shown in FIG. 1, part 1 integrates at least one decorative and/or functional insert 5 on the surface. t insert 5 is visible due to the skin 2 opposing a viewer, and is embedded in the skin 2.

The method consists in producing the skin 2 (formed in accordance with the surface topology of the part 1), then placing the skin 2 in a foaming mold with the support layer 4, which leads to foaming employed to produce the intermediate layer 3. The method also includes a cutting out the skin 2 and placing the insert 5 in the area 6 of skin 2 (after the removal of the cut out portion 6').

The method may include a step of placing a piece 7 of adhesive tape or film in the skin area 6 intended to receive the insert 5, on the surface 2' of the skin 2 directed toward the intermediate foam layer 3, said piece 7 of adhesive tape or film constituting the bottom 8' of the cavity or indentation 8 defined after the removal of the cut out skin portion 6'.

Thus, the aspects disclosed herein ensure reliable and lasting securement of the insert 5, and a reliable and controlled sealing during the foaming phase (preventing the rise of foam into the indentation 8). Further, the aspects disclosed herein prevent the infiltration of water from outside in the direction of the intermediate layer 3.

In addition, the aspects disclosed herein allows for all shapes, sizes or numbers of the single added insert 5 or of the plurality of added inserts 5.

The piece 7 of adhesive tape or film may have a shape adapted to and dimensions greater than the cut out skin portion 6', in such a manner that after the removal of the cut out skin portion 6', the piece of tape or film 7 extends beyond the bottom 8' of the indentation 8 and is applied with adhesive connection on the back surface of the edges 9 of the cut-out in the skin 2.

The width of the peripheral area of the piece 7 that comes in contact with adhesive integral securing against the edges 9 can be adapted to the size of the indentation 8.

The piece 7 can extend as a single piece clearly beyond the edges 9, possibly over the entire back surface of the skin 2 or at least over a back surface area covering all the cut out areas of the skin (in the case of a plurality) or at least several such areas.

Piece 7 from a tape or film may be provided so that it is adhesive at cold temperature, on one side or on both sides, and which comprises advantageously a support material (plastic sheet, woven or nonwoven material) suitable for constituting, on the one hand, a barrier that is a sealed barrier (at least with respect to the foamed product) between the internal volume of the indentation 8 of the skin 2 and the intermediate foam layer 3 and/or, on the other hand, a bottom 8' for the indentation 8 whose configuration allows contact with the back surface 5' of insert 5, and may be in a substantially flat configuration.

In order to provide a resistant integral securing of the insert 5 in the indentation 8, and/or in order to compensate for the loss of an adhesive agent following the removal of the cut out skin portion 6', the back surface 5' of the insert 5, which is applied against the bottom 8' of the indentation 8 of the skin 2 formed by a central part of the piece of adhesive tape or film 7, as well as optionally the side edges of said insert 5, can be provided with a layer of an adhesive substance identical to or at least compatible with the adhesive agent of said piece of adhesive tape or film 7.

In a supplementary or alternative manner and still for the purpose of optionally increasing the strength of the connection between the insert 5 and the part 1, it is possible to provide a piece of adhesive tape or film 7 whose properties of connection of its surface directed toward the intermediate foam layer 3, of its peripheral areas coming in contact with the edges 9 of the skin 2 delimiting the cut out area corresponding to the indentation 8 and/or of its surface coming in contact with the insert 5, is/are at least partially reinforced during the foaming of the intermediate layer 3.

In accordance with a first practical embodiment variant of the method according to the invention, which is illustrated in FIG. 1, after the skin 2 has been produced, for example, by rotational molding or by spraying on a nickel shell ("PU spray": spraying of PU—PolyUrethane) (step a), said method can consist of placing the piece of adhesive tape or film 7 on the non-visible back surface 2' of the skin 2, in the skin area 6 intended to receive the insert 5 (step b), producing the intermediate layer 3 by foaming (step c), then cutting out the skin 2 along a predetermined line, without cutting out the pieces of underlying adhesive tape or film 7, then removing the cut out portion 6' (step d) to clear the cavity or indentation 8 (step d'), and, finally arranging the insert 5 in said indentation 8 (step e).

The resulting formed part 1 is then extracted from the mold and subjected to additional finishing operations (for example, deburring, trimming, etc).

The shape of the portion 6' may be carried out by punching in the mold, and in another example, the shape of the portion 6' may be carried out by laser cutting during the finishing phase.

Figure 2:
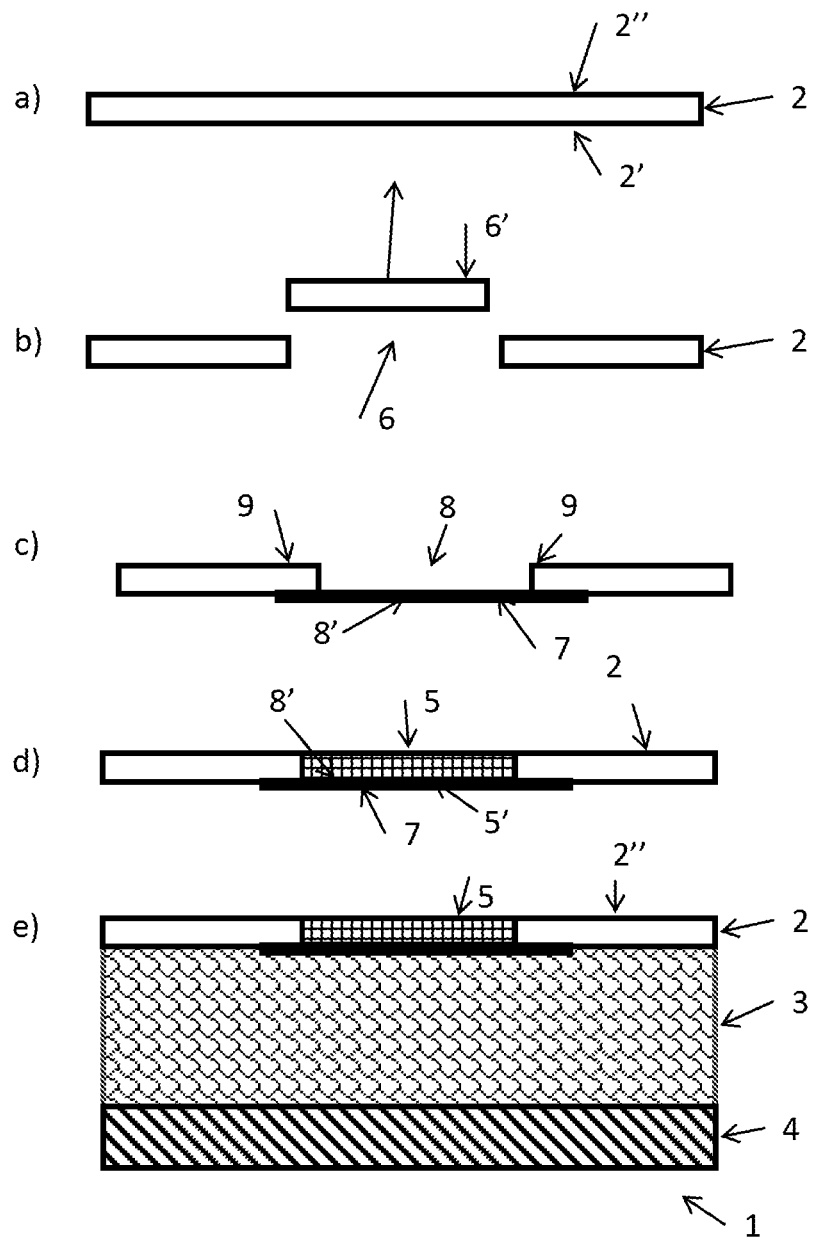
FIG. 2 illustrates diagrammatically the consecutive operating steps a) to e) of the method for manufacturing an interior trim or lining part according to another embodiment.

FIG. 2 illustrates diagrammatically the consecutive operating steps a) to e) of the method for manufacturing an interior trim or lining part according to another embodiment disclosed herein.

Referring to FIG. 2, the skin 2 may have been produced by rotational molding or by spraying on a nickel shell ("PU spray": spraying of PU—PolyUrethane) (step a). Then skin 2 may be cut along a predetermined line, and the cut out skin portion 6' may be removed (step b) to clear an opening corresponding to the volume of the indentation 8. The method may also include placing the piece of adhesive tape or film 7 on the non-visible back surface 2' of the skin 2, in such a manner as to form the bottom 8' of said indentation 8 (step c), arranging the insert 5 in said indentation (step d), and carrying out the foaming of the intermediate layer 3 on layer 4 (step e).

As above, after the end of the foaming, the part 1 is extracted and subjected to finishing operations.

In order to achieve a high quality finish, it is possible to provide for positioning the insert 5, in the foaming mold, by embedding in the opening in the skin 2 cleared after the removal of the cut out skin portion 6' and by applying with contact said insert 5 against the wall of the mold, the latter being provided locally with a recessed or projecting formation, when the insert 5 has a visible surface respectively protruding or recessed relative to the surface of the skin 2, said formation being produced in or on the wall of the mold or provided by a pad or block added to said wall.

Alternatively to the successive steps c) and d) of the second variant, it is also possible to provide for the placement of the insert 5 in the opening formed after the removal of the cut out portion 6' of the skin 2 to be carried out before or simultaneously with the placement of the piece of adhesive tape or film 7, by introduction through the back surface 2' of the skin 2.

Advantageously and still in connection with the second embodiment illustrated in FIG. 2, all the operating steps or phases after the production of the skin 2 or at least after the phase of cutting out the skin 2, are carried out in the mold for foaming the intermediate layer 3.

The cutting out of the skin 2 may be carried out by punching or stamping for indentation contours 8 having a simple shape or by cutting out with a water jet or a laser beam for indentation contours 8 having a complex shape.

In the above description it is described in relation to the placement of a single insert 5; however, a person skilled in the art understands that the invention can clearly be carried out with a plurality of inserts 5

In this context, it is then provided to produce several cavities or indentations 8 for receiving inserts 5 in the skin 2, by cutting out the latter in several separate areas, and by placing, before or after the cutting out, pieces of adhesive tapes or films 7 having respectively adapted shapes at the site of the cut-outs obtained, on the back surface 2' of the skin 2, and in mounting in each indentation 8, in a laterally adjusted manner, a corresponding insert 5 having a complementary shape.

The piece of adhesive tape or film 7 may also have a shape or so that it can cover the totality of the different cut out areas.

The inserts 5 mounted in the skin 2 may be substantially flat, for example, plate-shaped, structures with a thickness less than, equal to, or greater than that of the skin 2.

The inserts 5 May also comprise protruding or projecting formations extending clearly beyond the surface of the skin 2.

The portion(s) 7 and said at least one insert or the plurality of inserts 5 can be placed successively or in a single operation by a suitable device, for example, a tool (mounted on a robotic arm or handled by an operator) or an end-of-arm gripper.

The aspects disclosed herein may be implemented along with an interior trim or lining part 1, in particular for motor vehicles, including a surface skin 2, an intermediate layer 3 made of a foamed or cellular substance, and a support layer 4, said part 1 integrating, in addition, at least one decorative and/or functional insert 5 mounted in a corresponding surface indentation 8 defined by a cut out portion 6' of the skin 2.

This part 1 includes an indentation 8 that includes a bottom 8' consisting of part of a piece of adhesive tape or film 7, added to the surface 2' of skin 2 directed toward the intermediate foam layer 3.

The part 1 is obtained by the manufacturing method described above and illustrated by the examples in FIGS. 1 and 2, said part 1 including optionally several surface indentations 8 in which corresponding inserts 5 are mounted.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing an interior lining part with a surface skin, an intermediate foam layer, and a support layer; the interior lining part having at least one decorative or functional area integrated on its surface, the method comprising:
   producing the skin;
   placing the skin in a foaming mold with the support layer;
   foaming the intermediate layer;
   the method further comprising, prior to the step of placing the skin in a foaming mold with the support layer;
   cutting out and removing an area of the skin producing an exposed edge defining a cutout area;

placing an insert in the cutout area with at least a portion of the insert being surrounded by the exposed edge of the skin;

the method also having a step of placing a piece of adhesive tape or film under the cutout area, the piece of adhesive tape or film being placed directly under the skin; and the step of placing a piece of adhesive tape or film under the cutout area being performed after the step of cutting out and removing an area of the skin and prior to the step of placing an insert in the cutout area.

2. The method according to claim 1, wherein the skin cutout area defines a bottom facing the intermediate foam layer, wherein the piece of adhesive tape or film has a dimension greater than the cutout area, and wherein the piece of adhesive tape or film abuts the bottom of the skin adjacent the cutout area and is applied with an adhesive connection to the back of the skin.

3. The method according to claim 2, further including the step of cutting the piece of adhesive tape or film at a cold temperature being substantially below a high temperature of 300 C; the piece of adhesive tape or film having at least one and no more than two adhesive faces, and including an integral support material to make a tight barrier between the internal volume of the cut out area of the skin and the intermediate foam layer.

4. The method according to claim 3, further comprising applying a layer of an adhesive substance to a back surface of the insert facing the intermediate foam layer, wherein the adhesive substance is identical to or at least compatible with an adhesive agent of the piece of adhesive tape or film.

5. The method according to claim 4, wherein the piece of adhesive tape or film placed in the cutout area is at least partially reinforced in position within the cutout area during the foaming of the intermediate layer.

6. The method for manufacturing an interior lining part according to claim 5, further including:
holding at least a portion of the insert within the cutout area by the piece of adhesive tape or film.

7. The method according to claim 1, wherein the step of cutting out and removing an area of the skin is performed via a punching or stamping.

8. The method according to claim 1, wherein the step of cutting out and removing an area of the skin is performed via a water jet or a laser beam.

9. The method according to claim 1, wherein the skin defines a front surface opposite the intermediate foam layer, and further comprising positioning the insert in the foaming mold by embedding the insert in the cutout area with the insert being flush relative to the front surface of the skin.

10. The method according to claim 1, wherein the skin defines a back surface facing the intermediate foam layer, and further comprising positioning the insert in the foaming mold by embedding the insert in the cutout area with the insert being flush relative to the back surface of the skin.

11. The method according to claim 1, wherein the insert spans the entire cutout area and engages the exposed edge thereabout.

12. The method according to claim 1, further comprising cutting out and removing a plurality of separate areas of the skin to receive corresponding inserts and leaving an exposed edge defining a separate cutout area at each of the plurality of separate areas of the skin;
placing a piece of adhesive tape or film on the rear surface of the skin under each of the separate cutout areas, the piece of adhesive tape or film being placed in between the skin and the intermediate foam layer; and
placing an insert in each of the separate cutout areas.

13. The method according to claim 1, wherein the step of producing the skin is performed by rotational molding.

14. A method for manufacturing an interior lining part with a surface skin, an intermediate foam layer, and a support layer, comprising:
cutting out and removing an area of the surface skin producing an exposed edge defining a cutout area;
placing a piece of adhesive tape or film under the surface skin in the area expected to receive an insert;
placing the insert in the cutout area with at least a portion of the insert being held by the piece of adhesive tape or film;
placing the skin in a foaming mold with a support layer;
foaming an intermediate layer; and
wherein the step of foaming the intermediate layer is performed after cutting out and removing the area of the surface skin.

15. The method according to claim 14, wherein the skin defines a front surface opposite the intermediate foam layer, and further comprising positioning the insert in the foaming mold by embedding the insert in the cutout area with the insert being recessed or projecting relative to the front surface of the skin using a recessed or a projecting surface of the foaming mold or using a removable element of the foaming mold.

16. The method according to claim 14, wherein the step of placing an insert in the cutout area with at least a portion of the insert being surrounded by the exposed edge of the skin is performed within the foaming mold.

17. A method for manufacturing an interior lining part with a surface skin having a back surface, an intermediate foam layer, and a support layer; the interior lining part having at least one decorative or functional area integrated on its surface, the method comprising:
producing the surface skin;
cutting out and removing an area of the surface skin overlying said adhesive region after foaming the intermediate layer to produce an exposed edge defining a cutout area;
placing a piece of adhesive tape or film directly upon the back surface of the surface skin defining an adhesive region of the surface skin;
placing an insert in the cutout area with at least a portion of the insert being surrounded by the exposed edge of the skin;
holding at least a portion of the insert within the cutout area by the piece of adhesive tape or film;
placing the surface skin in a foaming mold with the support layer;
foaming the intermediate layer after placing the skin in the foaming mold.

* * * * *